(12) United States Patent
Pier et al.

(10) Patent No.: US 8,474,597 B2
(45) Date of Patent: Jul. 2, 2013

(54) TRAY FOR ORIENTING AND CONVEYING ITEMS

(75) Inventors: Michael T. Pier, Fox Point, WI (US); Michael S. Paar, Wauwatosa, WI (US)

(73) Assignee: Nordco Inc., Oak Creek, WI (US)

( * ) Notice: Subject to any disclaimer, the term of this patent is extended or adjusted under 35 U.S.C. 154(b) by 191 days.

(21) Appl. No.: 13/053,531

(22) Filed: Mar. 22, 2011

(65) Prior Publication Data

US 2012/0240811 A1 Sep. 27, 2012

(51) Int. Cl.
*B65G 47/24* (2006.01)
(52) U.S. Cl.
USPC .......................................... 198/396; 198/389
(58) Field of Classification Search
USPC .......... 198/389, 390, 394, 396, 398; 193/2 R, 193/4, 25 F T, 28, 34
See application file for complete search history.

(56) References Cited

U.S. PATENT DOCUMENTS

| 1,615,137 | A | * | 1/1927 | Ruby | 221/157 |
|---|---|---|---|---|---|
| 1,747,140 | A | * | 2/1930 | Smith | 193/31 R |
| 3,203,590 | A | * | 8/1965 | Maki | 221/175 |
| 3,581,665 | A | | 6/1971 | Johnson | |
| 3,907,099 | A | * | 9/1975 | Smith | 198/389 |
| 4,014,460 | A | * | 3/1977 | Bryan, Jr. | 198/396 |
| 5,398,616 | A | | 3/1995 | Eidemanis et al. | |
| 5,465,667 | A | | 11/1995 | Hosking et al. | |
| 6,155,175 | A | | 12/2000 | Rude et al. | |
| 6,257,395 | B1 | | 7/2001 | Yokajty et al. | |
| 7,104,200 | B2 | | 9/2006 | Hosking et al. | |
| 7,216,590 | B2 | | 5/2007 | Eldridge et al. | |

* cited by examiner

*Primary Examiner* — James R Bidwell
(74) *Attorney, Agent, or Firm* — Greer, Burns & Crain, Ltd.

(57) ABSTRACT

A tray is provided for orienting and conveying items having a longitudinal axis, a tip, an opposite head, and a head-up and a head-down orientation, the tray conveying the items in a direction of travel and including a series of connected, function-oriented static regions configured for orienting the item from a random orientation to a desired tip-down orientation, at least one of the regions being inclined for facilitating movement of the item through the regions, the regions being configured such that proper orientation of the item is achieved without operator contact.

19 Claims, 10 Drawing Sheets

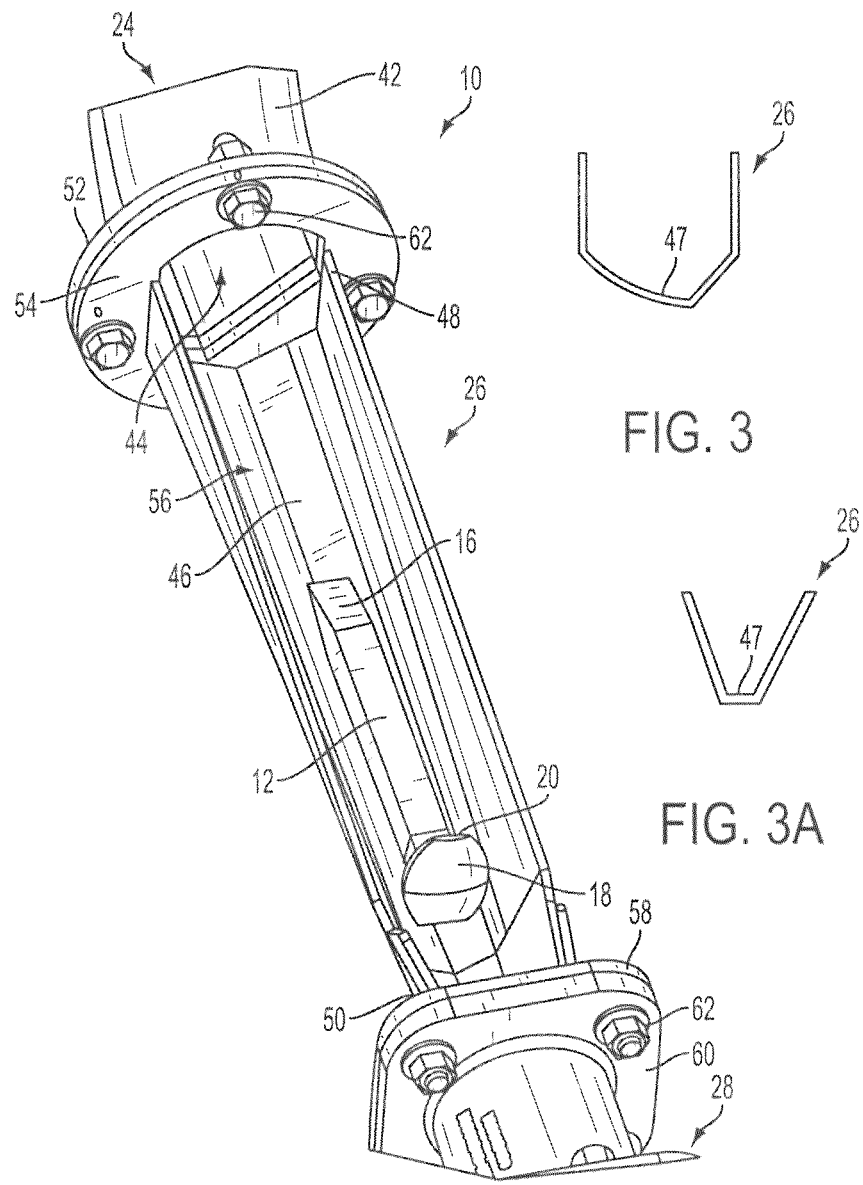
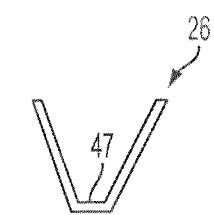
FIG. 3
FIG. 3A
FIG. 4

TRAY FOR ORIENTING AND CONVEYING ITEMS

RELATED APPLICATION

The present application is related to commonly assigned, co-pending US Patent Applications for Singulator for Sorting Random Items (Ser. No. 13/053,526), and for Automatic Spike Feeder System (Ser. No. 13/053,523), both of which are incorporated by reference.

BACKGROUND

The present invention relates generally to material handling equipment, and more specifically to equipment for orienting sorted items, such as rail spikes and similar fasteners.

While the present application is intended for use in handling and sorting rail spikes, it is contemplated that the present apparatus is usable in orienting other rail fasteners such as lag bolts, hairpin spikes, Lewis bolts and the like, as well as other items needing repositioning while being conveyed to an operational destination. Currently, rail spikes used in a rail maintenance gang are stored in bulk and delivered in relatively small groups to an operator station by a reciprocating ram, as disclosed in commonly-assigned U.S. Pat. No. 7,216,590 which is incorporated by reference. In conventional rail maintenance operations employing the reciprocating ram, a designated operator draws individual spikes from the small group supplied by the ram, manually orients them in proper top-to-bottom and front-to-back position, and inserts them into a feed tray of a rail fastener driver magazine, of the type disclosed in commonly-assigned U.S. Pat. Nos. 5,398,616; 5,465,667 and 7,104,200, all of which are incorporated by reference. Manual loading of such feed trays is a tedious task, which also distracts the attention of the operator who is also controlling the spike driving operation. When two operators are provided, one to load the spike tray and one to control the spike driving mechanism, there is additional labor cost to the railroad for performing the spiking operation.

There is a continuing motivation by railroads to reduce the required labor of rail maintenance operations. Accordingly, maintenance machinery manufacturers have attempted to automate tasks where possible.

SUMMARY

The above-identified need for continued automation of rail maintenance tasks is met by the present orienting tray, also referred to as a spike tray. In the present tray, spikes are sequentially received from an orienting device, in a point first or head-first orientation. Using gravity and specially shaped tray walls and components, the present tray properly orients the spikes for ultimate delivery to a spike feeder magazine in a uniform, designated orientation, with the tip down, head up and the head properly oriented.

In the preferred embodiment, the spike tray has four main distinct regions: the Upper Basket or basket, the Orientation Chute, the Orientation Twist, and the Lower Spike Tray. The Upper Basket includes a hopper configured for receiving a spike to begin the orientation process. Spikes of any orientation are delivered to the basket. Next, the spike travels by gravity to the Orientation Chute, where geometry of a bottom surface of the chute orients the spikes so that the head is facing up, regardless of whether the spikes are tip first or head first in the chute.

Following the Orientation Chute, the spikes travel by gravity to the Orientation Twist. Entering the Orientation Twist, the spikes are oriented with their axis in the direction of travel and either tip first or head first. However, the heads are up. In the Orientation Twist, the spikes are rotated at the head end either clockwise or counterclockwise in the range of 20 to 70° from vertical. At the exit of the Twist, the spikes retain this orientation.

Lastly, in the Lower Spike Tray, the spikes are initially oriented with their axes in the direction of travel, and are either tip first or head first, with the head rotated 20 to 70° relative to vertical. As the spikes progress through the Lower Spike Tray, the configuration of the Tray causes each spike to change orientation. Only the tip and shank portion of a spike will drop through a slot in the floor of the Lower Tray, placing the head above the tip. At this point, the head direction will either be left in a counter clockwise tray, or right in a clockwise tray.

More specifically, a tray is provided for orienting and conveying items having a longitudinal axis, a tip, an opposite head, and a head-up and a head-down orientation, the tray conveying the items in a direction of travel and including a series of connected, function-oriented static regions configured for orienting the item from a random orientation to a desired tip-down orientation, at least one of the regions being inclined for facilitating movement of the item through the regions, the regions being configured such that proper orientation of the item is achieved without operator contact.

In another embodiment a tray is provided for orienting and conveying items having a longitudinal axis, a tip, an opposite head, and a head-up and a head-down orientation, the tray conveying the items in a direction of travel. The tray includes a basket configured for receiving items and orienting them such that the longitudinal axis is oriented in the direction of travel. An orientation chute is in communication with the basket and has a generally narrowing cross-sectional profile. The chute is sufficiently inclined for promoting sliding and partial rotation of the items received from the basket so that at a chute outlet, an item head-up orientation is achieved.

An orientation twist is in communication with the chute outlet and is provided with a helical pathway for rotating the item head a desired amount. The pathway has an exit port. A lower spike tray is in communication with the exit port and is configured for receiving the items in a rotated head orientation. The lower spike tray has a slot dimensioned for receiving the tips, so that the items are oriented tip-down, head-up, and constructed and arranged for delivering the items to a tray outlet.

In yet another embodiment, a spike tray is provided for orienting railroad spikes for delivery to a rail spiker magazine, the spikes having a longitudinal axis, a tip, an opposite head, and a head-up and a head-down orientation. The tray is configured for conveying the items in a direction of travel and includes an upper basket configured for receiving spikes and orienting them such that the longitudinal axis is oriented in the direction of travel, and the spikes are either tip first or head first. An orientation chute is in communication with the upper basket for receiving the spikes in either a tip first or a head first orientation, and having a generally narrowing cross-sectional "U"-shaped profile. The chute is oriented at a sufficient incline to promote sliding and partial rotational movement of the spikes so that at an outlet of the chute, a head-up spike orientation is achieved.

An orientation twist is in communication with the outlet of the orientation chute and is provided with a helical pathway configured for slidingly accommodating a spike head for rotating the spike head a desired amount. The pathway has an exit port through which the spikes travel head first or tip first. A lower spike tray is in communication with the twist, is configured for receiving the spikes in a rotated head orientation, and has a slot dimensioned for receiving the tips, so that as the tips fall through the slot the spikes are oriented tip-down, head-up. The lower spike tray is constructed and arranged for delivering the items to a tray outlet.

BRIEF DESCRIPTION OF THE DRAWINGS

FIG. 3 is a vertical cross-section of the Orientation Chute taken along the line 3-3 of FIG. 1 and in the direction generally indicated;

FIG. 3A is a vertical cross-section of the Orientation Chute taken along the line 3A-3A of FIG. 1 and in the direction generally indicated;

FIG. 4 is a top perspective view of a spike in the Orientation Chute;

DETAILED DESCRIPTION

Figure 1:
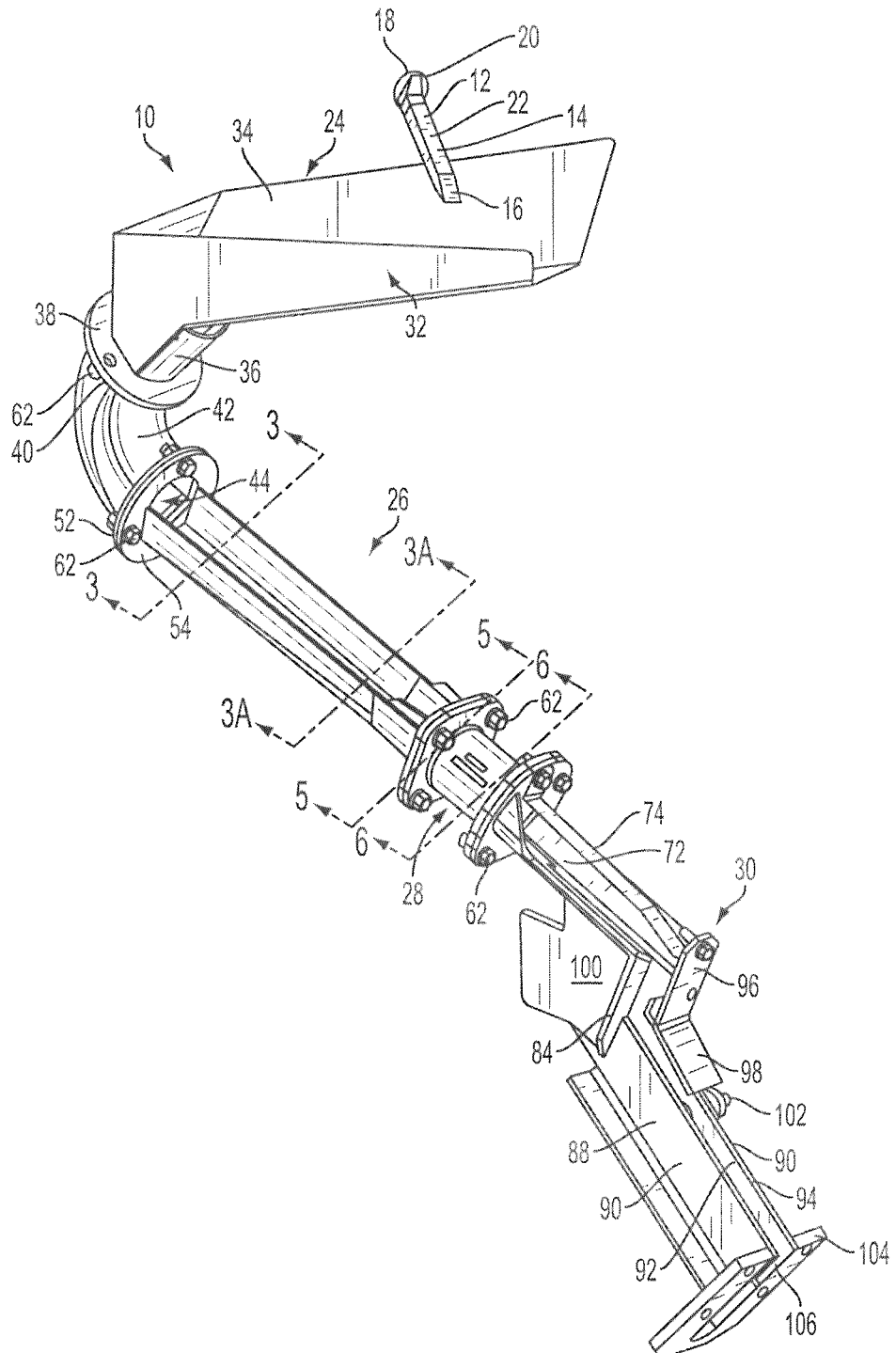
FIG. 1 is a top perspective view of the present spike tray with a spike being fed into the Upper Basket.

Referring to FIG. 1, the present orienting tray, also referred to as a spike tray is generally designated 10, constructed and arranged for orienting items 12. While the present tray 10 is preferably designed for use with rail cut spikes, depicted as the item 12, it is contemplated that the present tray can accommodate other types of rail fasteners, such as lag bolts, Lewis bolts, hairpin spikes, as well as other types of items. As such, in the present application, it will be understood that "items" designates rail spikes as well as other rail fasteners or objects suitable for being sorted in the present tray 10.

Further, it is also contemplated that the present orienting tray 10 is mounted on a moving rail maintenance vehicle (not shown) of the type disclosed in the patents referenced above and well known in the rail maintenance industry, and it is preferred that the tray is disposed on such a vehicle in operational proximity to a spike feeder system, of the type disclosed in co-pending, commonly-assigned U.S. patent application Ser. No. 13/053,523 which in turn receives items 12 from a singulator of the type disclosed in co-pending, commonly assigned U.S. patent application Ser. No. 13/053,526, both of which are incorporated by reference. Basically the function of the feeder system and the singulator referenced above is to provide the present tray 10 with a source of items 12 which have been separated from bulk storage and supplied in a generally horizontal orientation.

Figures 5, 5A:
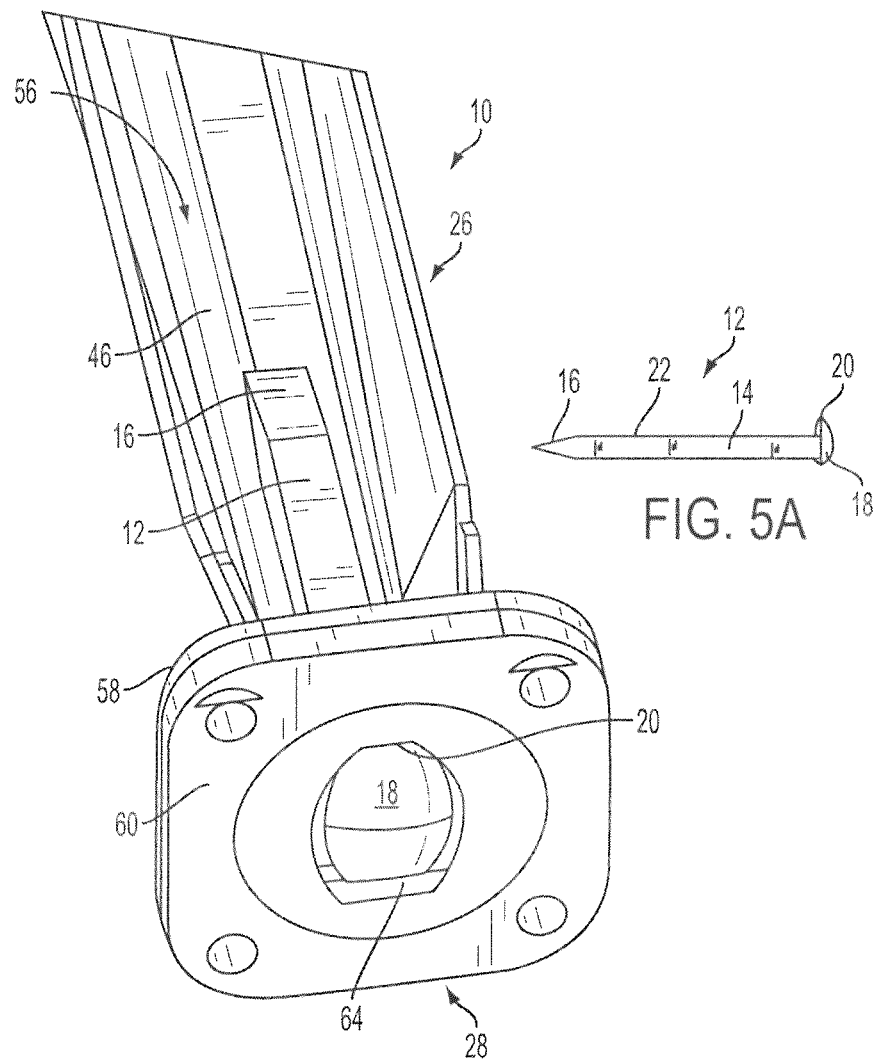
FIG. 5 is a top perspective view of the outlet end of the Orientation Chute with an entry cross-section through the Orientation Twist taken along the line 5-5 of FIG. 1 and in the direction generally indicated.
FIG. 5A is a side view of a rail spike in a head up orientation.

Referring now to FIGS. 1 and 5A, as used in the present application, an item 12, here a rail cut spike, has a shank portion 14 with a tip 16 at one end, and a head 18 at the opposite end from the tip. As is well known in the art, the shank portion 14 is typically square or rectangular in transverse cross-section, and defines a longitudinal axis of the item 12. Also, the'head 18 is offset on the shank portion 14, so that an edge 20 of the head projects laterally from a corresponding side 22 of the shank portion. In FIGS. 1, 4 and 5A, the item 12 is shown in a head-up orientation, while in FIG. 2, the item is shown in a head-down orientation.

In view of the above-described background the present tray 10 is provided for orienting and conveying items 12 by conveying the items in a direction of travel and including a series of connected, function-oriented static regions configured for orienting the item from a random orientation to a desired tip-down orientation. In the present application, "static" refers to the fact that the regions do not have moving parts such as robotic arms, etc. and the items are manipulated by contour, inclination and/or geometry. At least one of the regions is inclined for facilitating movement of the item through the regions, the regions being configured such that proper orientation of the item is achieved without operator contact.

Returning now to FIG. 1, the present tray 10 includes four or five major components or regions. At an upper end, an Upper Basket or basket 24 receives the items 12 in a variety of orientations, including tip 16 first or head 18 first. Connected to the Upper Basket 24 is an Orientation Chute or chute 26, an Orientation Twist or twist 28, and the Lower Spike Tray or LST 30. Included in the Upper Basket is a hopper 32 having a funnel 34 configured for receiving an item 12 to begin the orientation process. A lower end of the hopper 32 defines a tubular opening 36.

Figure 2:
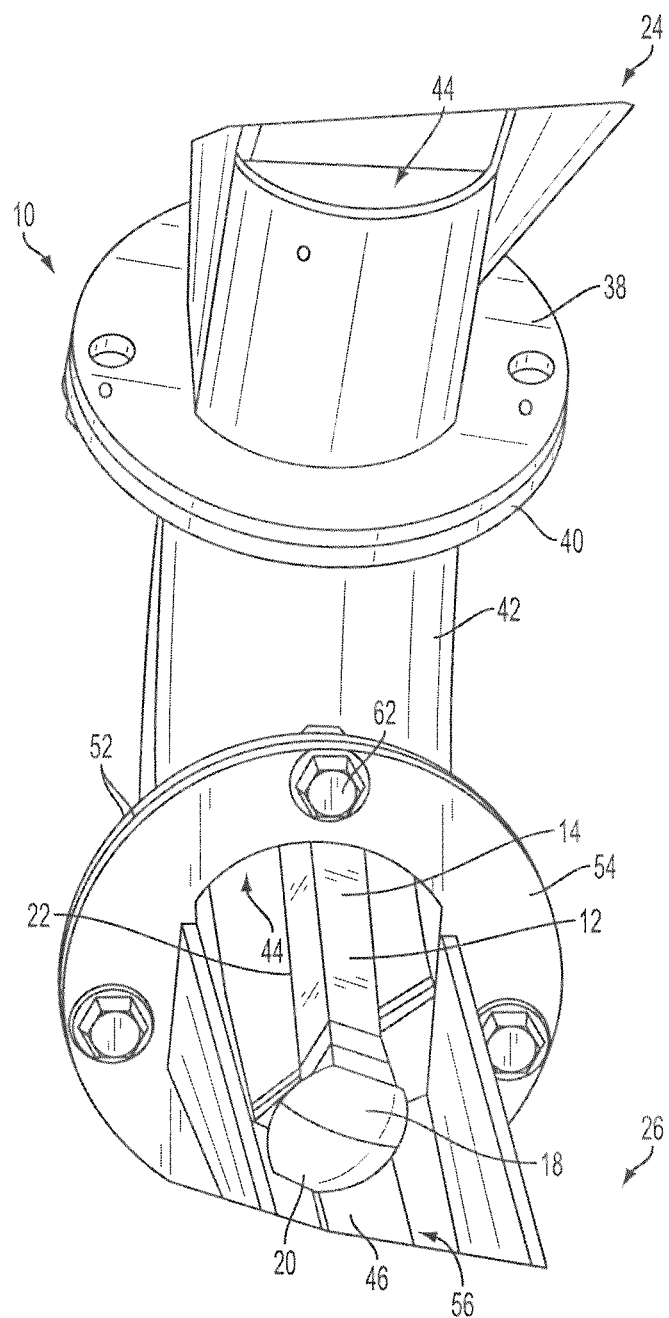
FIG. 2 is an enlarged fragmentary perspective of the junction of the Upper Basket with the Orientation Chute.

Referring now to FIGS. 1, 2 and 2A-2C, a radial flange 38 on the basket 24 connects to a corresponding flange 40 on a tubular elbow portion or elbow 42, such that the tubular opening 36 and the elbow define a basket passageway 44. It is contemplated that the elbow 42 may be considered a separate component of the tray 10, depending on the application, hence there may be four or five major regions. Items 12 of any orientation are delivered to the basket 24, but more frequently are delivered tip first or head first, and the objective of the basket 24 and the elbow 42 is to orient the items so that the longitudinal axis is oriented in the direction of travel through the tray 10 (FIG. 2). The Upper Basket 24 is disposed vertically above the elbow 42 to feed the items 12 to elbow by gravity.

Figure 2A:
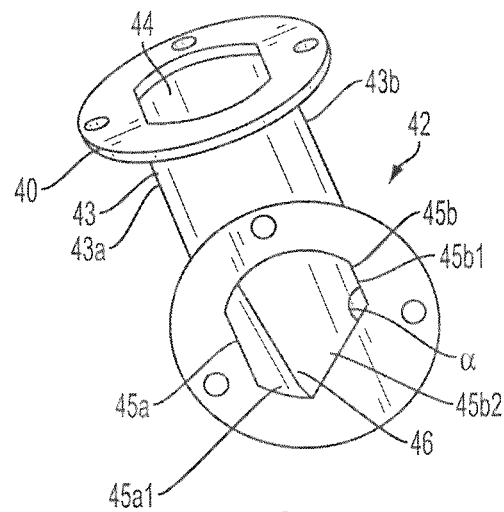
FIG. 2A is a bottom perspective view of the present elbow shown disassembled from the chute.
Figure 2B:
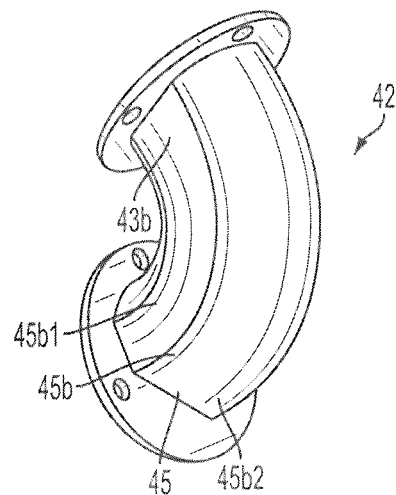
FIG. 2B is a first lower side perspective view of the elbow of FIG. 2A.
Figure 2C:
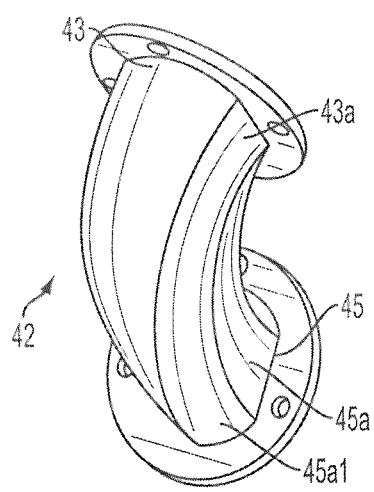
FIG. 2C is a second lower side perspective View of the elbow of FIG. 2A.

As seen in FIGS. 2A-2C, the preferred construction of the tubular elbow 42 facilitates the desired orientation of the item 12 by providing a changing configuration from a first end 43, which is generally oval and symmetrical, with a pair of parallel, straight sides 43a, 43b. A second, opposite end of the elbow 45 has a first side 45a which is generally straight, with a lower curved portion 45a1, but a second side 45b includes panels 45b1 and 45b2 defining an obtuse angle α and also defining a narrowed, somewhat "V"-shaped outlet 46 that causes items 12 passing through the elbow 42 to assume the desired orientation in the direction of travel. Other elbow configurations are contemplated provided the desired function of spike orientation is achieved.

Referring now to FIGS. 3, 3A and 4, next, the item 12 travels by gravity through the elbow 42 to the Orientation Chute 26, where geometry of a chute bottom surface 47 orients the items so that the head 18 is facing up, regardless of whether the items are tip first or head first in the chute. A combination of the amount of inclination of the chute 26, the length of the chute, a narrowing cross-sectional geometry of the chute, which is also asymmetrical in cross-section (FIG. 3) and an optional coating of low friction material such as TEFLON® material on the chute combine to cause the item 12 to be slidably and rotationally oriented to the desired position (FIG. 4), basically because the item is heavier and more stable in the head-up, position. It is contemplated that variations of the above-identified parameters may be used to adjust the velocity of the item 12 in the chute 26 to achieve proper orientation, depending on the application. In the preferred embodiment, the chute 26 is generally "U"-shaped in cross-section, and gradually narrows from a first end 48 connected to the Upper Basket 24, and a second end 50 connected to the Orientation Twist 28. As is the case with the Upper Basket 24, connection of the chute 26 to the Upper Basket is preferably accomplished using flanges 52, 54 or similar structure known in the art, however direct welding or other fastening technologies are contemplated. It has also been found that by providing the elbow 42 with the narrowed outlet 46 provides additional time for the item to be properly rotationally oriented as shown in FIG. 4. Also, the chute 26 defines a chute passageway 56 in communication with the basket passageway 44.

In the preferred tray 10, the angle of inclination of the chute 26 is approximately 25°, however other angles are contemplated depending on the situation and the type of item to be oriented. Note that FIGS. 3 and 3A depict the difference in cross-sectional profile of the chute 26 which promotes the change in item orientation to that desired as shown in FIG. 4. While a multi-faceted bottom 46 is depicted in FIGS. 3, 3A and 4, other shapes are contemplated based on manufacturing preferences.

Figure 6:
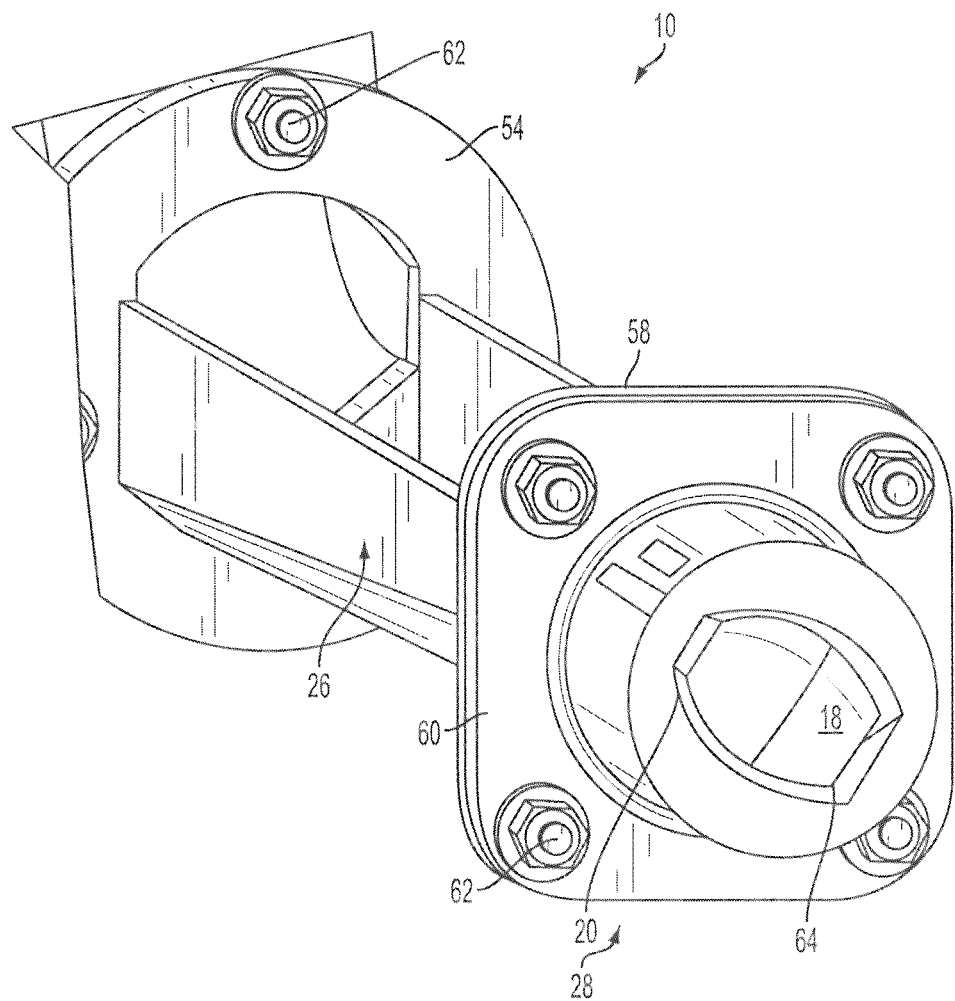
FIG. 6 is a top perspective view of the Orientation Chute showing a cross-section taken along the line 6-6 of FIG. 1 and in the direction generally indicated.

Referring now to FIGS. 5 and 6, following the Orientation Chute 26, the items 12 travel by gravity, either tip 16 first or head 18 first, in a head-up orientation to the Orientation Twist 28. Regardless of orientation, the items 12 are oriented with their longitudinal axis in the direction of travel. As is common to other portions of the tray 10, the chute 26 is connected to the twist 28 using radial flanges 58, 60 secured by fasteners 62, welding or other fastening technologies, as is well known in the art. In the Orientation Twist 28, a helical pathway 64 is defined, is in communication with the chute passageway 56 and is preferably shaped in cross-section to slidingly accommodate the head 18 and yet rotate the head a desired amount. The pathway 64 is preferably dimensioned to slidingly accommodate heads 18 of a variety of types of items 12. Preferably, the twist 28 is configured such that the items 12 are rotated at the head 18, either clockwise or counterclockwise in the range of 20 to 70° from vertical. At an exit 66 of the twist 28 (FIG. 7), the items 12 retain this orientation.

Figure 7:
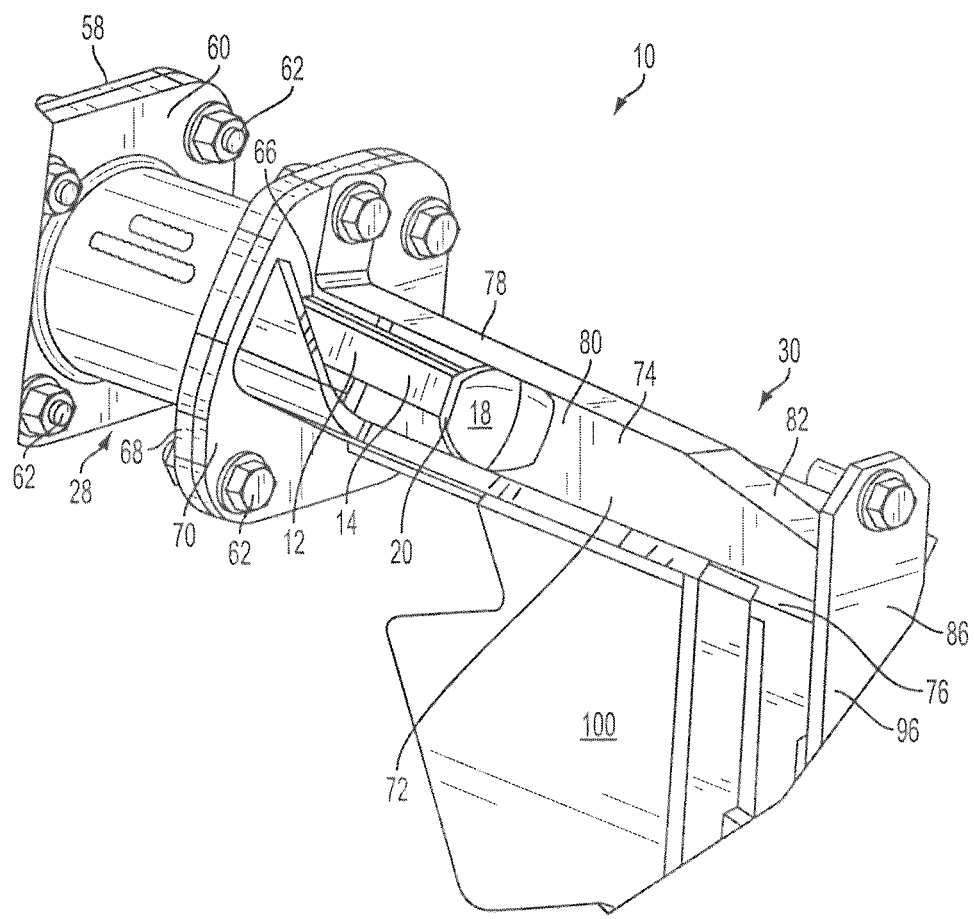
FIG. 7 is a fragmentary top perspective view of the Lower Spike Tray showing a spike entering the Tray.

Referring now to FIGS. 1 and 7, the Lower Spike Tray 30 is connected to the twist 28 using corresponding flanges 68, 70 and the fasteners 62. The helical pathway 64 of the twist 28 is in communication with a channel 72, which is generally "Z"-shaped to correspond to the shape of the LST 30 when viewed from the side (FIG. 1). As is the case with the chute 26 and the twist 28, the LST 30 is inclined for promoting gravity flow of the items 12, but other angles are contemplated as described above.

The lower spike tray 30 is configured for receiving the items 12 in a rotated head orientation, and has a first zone 74 with a generally tubular, open-topped configuration and a sufficient length for receiving items from the twist 28. While other angles are contemplated, the first zone is preferably inclined at 25° from horizontal. In the LST 30, the items 12 are initially oriented with their axes in the direction of travel, and are either tip first or head first, with the head rotated 20 to 70° relative to vertical. As the items 12 progress through the LST 30, the configuration of the tray causes the item to change orientation.

Once cleared of the twist 28, the items 12 encounter a slot 76 extending along an axis of the first zone 74 and dimensioned for accommodating only the tips 16 and the shank portion 14, so that the items achieve a head-up, tip-down orientation, with the heads 18 maintaining the orientation of the twist 28. At this point, the head direction will either be left in a counter clockwise tray, or right in a clockwise tray. An optional component of the first zone 74 is an elongate, biased keeper 78 partially enclosing an upper end 80 of the first zone for maintaining proper head orientation of the items. The keeper 78 is fastened to the flange 70 and has a free end 82.

Figure 8:
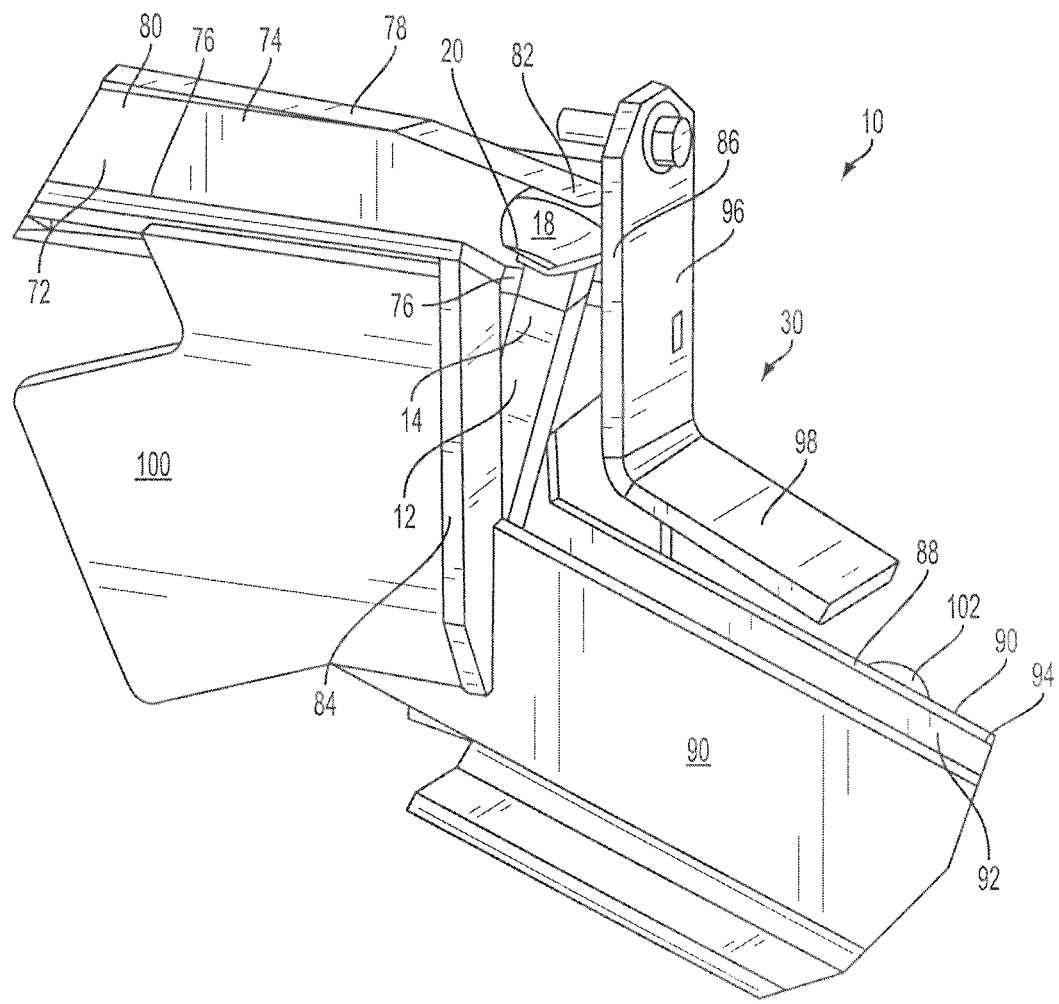
FIG. 8 is a fragmentary top perspective of a first stage of the Lower Spike Tray showing a spike becoming oriented tip down.
Figure 9:
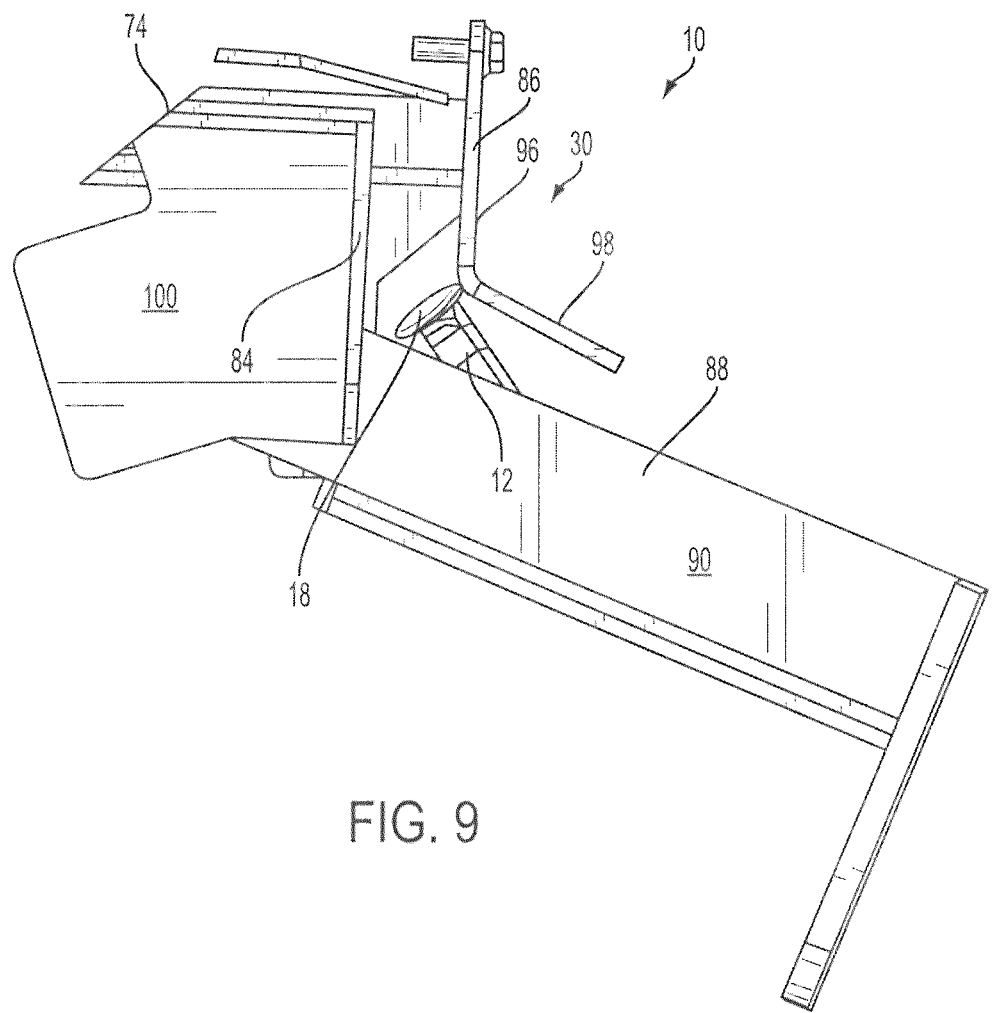
FIG. 9 is a side elevation of a second stage of the Lower Spike Tray showing a spike entering the stage.
Figure 10:
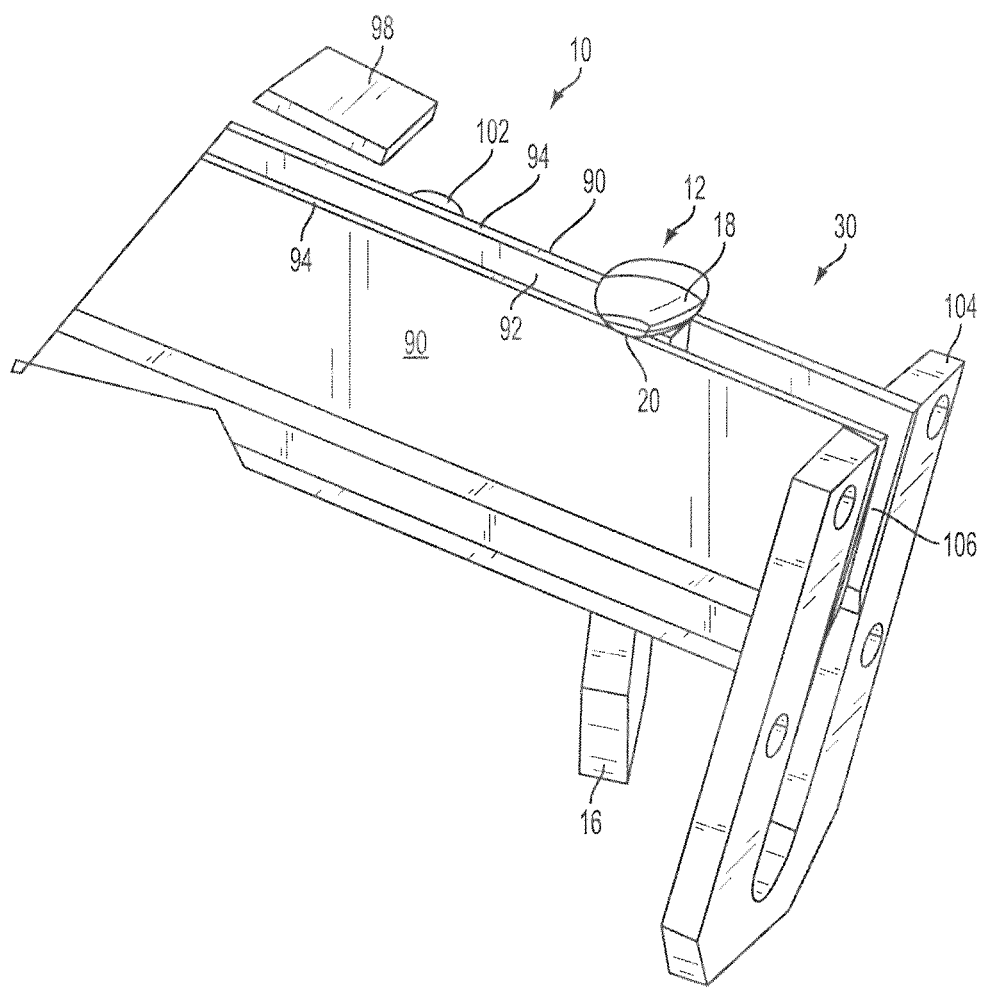
FIG. 10 is a fragmentary top perspective view of the second stage of the Lower Spike Tray showing the spike in a properly oriented position for delivery to the spike feeder tray of a spiker magazine.

Referring now to FIGS. 8-10, at the end of the first zone 74, the LST 30 is provided with a second, transition zone 84 in communication with the channel 72 and defining a backstop 86 for receiving the items 12 sliding down the inclined lower spike tray, and causing the items to fall vertically in a tip-down position to engage a third, spike feed zone 88 defined by spaced, parallel plates 90 creating a path 92 accommodating the items such that heads 18 of the items slidingly engage upper edges 94 of the plates defining the path. While other angles are contemplated depending on the application, the third, spike feed zone 88 is preferably angled at 45° relative to horizontal. It will be understood that the transition zone 84 is not inclined as are other components of the tray 10. This construction is intended to reduce the velocity of the items 12 as they progress down the path 92.

In the preferred embodiment, the backstop 86 is secured to the tray 10 and is generally "L"-shaped, with a first, generally vertically oriented leg 96 which performs the backstop function, and a second, generally horizontally or obliquely oriented leg 98 serving as an anti-swing bracket disposed above the plates 90 for preventing items 12 from swinging out from the slot 76 or the transition zone 84 as they fall in the transition zone to the third zone 88. It will be appreciated that the first leg 96 also assists in maintaining alignment of the items 12 in the transition zone 84.

Referring now to FIGS. 1, 8, 9 and 10, a pair of opposed, generally spaced, "V"-oriented guide plates 100 connects the first zone 74 to the third zone 88. The plates 100 are preferably welded in place or secured by other fastening technologies. Further, an optional item sensor 102 is mounted to the LST 30, preferably on one of the plates 90, for sensing items passing through the LST. Signals are then transmitted to the companion components such as the singulator and the automatic spike controller, for adjusting the flow of items 12 to meet the demand. A lower end 88 of the LST 30 forms a generally "U"-shaped flange 104 defining a tray outlet 106 for securing the LST to a standard spike tray, known in the art and described in the patents incorporated by reference.

While a particular embodiment of the present tray for orienting and conveying items has been shown and described, it will be appreciated by those skilled in the art that changes and modifications may be made thereto without departing from the invention in its broader aspects and as set forth in the following claims.

What is claimed is:

1. A tray for orienting and conveying items having a longitudinal axis, a tip, an opposite head, and a head-up and a head-down orientation, said tray conveying the items in a direction of travel and comprising:
   a series of connected, function-oriented static regions configured for orienting the item from a random orientation to a desired tip-down orientation, at least one of said regions being inclined for facilitating movement of the item through said regions, said regions being configured such that proper orientation of the item is achieved without operator contact, wherein said regions include:
   an upper basket configured for receiving items and orienting them such that the longitudinal axis is oriented in the direction of travel;
   an orientation chute in communication with said basket and having a generally narrowing cross-sectional profile, said chute being sufficiently inclined for promoting sliding and partial rotation of the items received from the basket so that at a chute outlet, an item head-up orientation is achieved;
   an orientation twist portion in communication with said chute outlet and provided with a helical pathway for rotating the item head a desired amount, said pathway having an exit port; and
   a lower spike tray in communication with said helical pathway and configured for receiving the items in a rotated head orientation, and having a slot dimensioned for receiving the tips, so that the items are oriented tip-down, head-up, and constructed and arranged for delivering the items to a tray outlet.

2. The tray of claim 1 wherein said regions include individual portions each configured for orienting the item in a designated one of a longitudinal axis of the item is in the direction of travel, a head-up orientation, and the tip-down orientation.

3. The tray of claim 1 wherein said upper basket includes a hopper portion and an elbow portion defining a common basket passageway.

4. The tray of claim 3 wherein said upper basket is disposed vertically above said elbow portion to feed items to said elbow by gravity and said elbow has a narrowed exit.

5. The tray of claim 1 wherein said orientation chute is generally "U"-shaped in cross-section, and gradually narrows from a first end connected to said upper basket, to a second end connected to said orientation twist, said chute defines a chute passageway in communication with said basket passageway.

6. The tray of claim 5 wherein said chute is oriented at a sufficient incline so that items received from said upper basket are slidingly delivered to said second end, and said second end is dimensioned to receive the items in a head-up orientation.

7. The tray of claim 1 wherein said helical path defined by said orientation twist is in communication with a basket passageway defined by said upper basket and a chute passageway defined by said orientation chute, and having a general cross-section resembling the shape of the item, so that the head of the item is rotated in the range of 20-70° relative to vertical.

8. The tray of claim 1 wherein said lower spike tray is inclined for promoting gravity flow of the items and has a first zone with a generally tubular configuration and a sufficient length for receiving items from said orientation twist, and once cleared of the twist, the items encounter an axial slot dimensioned for accommodating the tips, so that the items achieve a head-up, tip-down orientation with the heads maintaining the orientation of said orientation twist.

9. The tray of claim 7 wherein said lower spike tray further includes an elongate, biased keeper partially enclosing an upper end of said first zone for maintaining proper head orientation of the items.

10. The tray of claim 8 wherein said lower spike tray has a second, transition zone in communication with said first zone and defines a backstop for receiving the items sliding down the inclined lower spike tray, and causing the items to fall vertically in a tip-down position.

11. The tray of claim 10 further including a third, spike feed zone defined by spaced, parallel plates creating a path accommodating the items such that heads of the items slidingly engage upper edges of the plates defining said path.

12. The tray of claim 11 further including an anti-swing bracket disposed above said plates and adjacent said second zone for preventing items from swinging out from said second zone as they fall in said transition zone to said third zone.

13. The spike tray of claim 12 wherein said anti-swing bracket also defines a backstop surface of said transition zone.

14. The spike tray of claim 11 wherein said transition zone further includes generally spaced, parallel guide plates connecting said first zone to said third zone.

15. The spike tray of claim 1, wherein said orientation chute, said orientation twist and said lower spike tray are oriented at an approximate 25-45° incline.

16. The spike tray of claim 1, further including an item sensor mounted to said lower spike tray for sensing items passing through said lower spike tray.

17. The spike tray of claim 1, wherein said lower spike tray is generally "Z"-shaped when viewed from a side.

18. A tray is provided for orienting and conveying items having a longitudinal axis, a tip, an opposite head, and a head-up and a head-down orientation, the tray conveying the items in a direction of travel, comprising:
   a basket configured for receiving items and orienting them such that the longitudinal axis is oriented in the direction of travel;
   an orientation chute is in communication with said basket and has a generally narrowing cross-sectional profile, being sufficiently inclined for promoting sliding and partial rotation of the items received from said basket so that at a chute outlet, an item head-up orientation is achieved;
   an orientation twist in communication with said chute outlet and is provided with a helical pathway for rotating the item head a desired amount, said pathway having an exit port; and
   a lower spike tray is in communication with said exit port and is configured for receiving the items in a rotated head orientation, said lower spike tray has a slot dimensioned for receiving the tips, so that the items are oriented tip-down, head-up, and constructed and arranged for delivering the items to a tray outlet.

19. A spike tray for orienting railroad spikes for delivery to a rail spiker magazine, the spikes having a longitudinal axis, a tip, an opposite head, and a head-up and a head-down orientation, said tray conveying the items in a direction of travel and comprising:
   an upper basket configured for receiving spikes and orienting them such that the longitudinal axis is oriented in the direction of travel, and the spikes are either tip first or head first;
   an orientation chute in communication with said upper basket for receiving the spikes in either a tip first or a head first orientation, and having a generally narrowing cross-sectional "U"-shaped profile, said chute being oriented at a sufficient incline to promote sliding and partial rotational movement of the spikes so that at an outlet of the chute, a head-up spike orientation is achieved;

an orientation twist in communication with said outlet of said orientation chute and provided with a helical pathway configured for slidingly accommodating a spike head for rotating the spike head a desired amount, said pathway having an exit port through which the spikes travel head first or tip first;

a lower spike tray in communication with said twist and configured for receiving the spikes in a rotated head orientation, and having a slot dimensioned for receiving the tips, so that as the tips fall through the slot the spikes are oriented tip-down, head-up, and said lower spike tray being constructed and arranged for delivering the items to a tray outlet.

* * * * *